(12) United States Patent
Niwa et al.

(10) Patent No.: US 11,780,341 B2
(45) Date of Patent: Oct. 10, 2023

(54) CHARGING INLET

(71) Applicant: TOYOTA JIDOSHA KABUSHIKI KAISHA, Toyota (JP)

(72) Inventors: Yamato Niwa, Kariya (JP); Tomoya Ono, Toyota (JP); Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/570,465

(22) Filed: Jan. 7, 2022

(65) Prior Publication Data

US 2022/0234454 A1 Jul. 28, 2022

(30) Foreign Application Priority Data

Jan. 28, 2021 (JP) ................ 2021-011918

(51) Int. Cl.
*B60L 53/16* (2019.01)
*B60L 53/10* (2019.01)
*H01R 13/11* (2006.01)
*H01R 13/64* (2006.01)

(52) U.S. Cl.
CPC .......... *B60L 53/16* (2019.02); *B60L 53/11* (2019.02); *H01R 13/111* (2013.01); *H01R 13/64* (2013.01); *B60L 2210/30* (2013.01); *H01R 2201/26* (2013.01)

(58) Field of Classification Search
CPC ................. B60L 53/16; H01R 13/64
See application file for complete search history.

(56) References Cited

U.S. PATENT DOCUMENTS

| 5,545,046 | A | 8/1996 | Masuda et al. |
| 9,278,624 | B2* | 3/2016 | Kinomura ............ B60L 53/16 |
| 11,303,073 | B2* | 4/2022 | Rhodes .................. H01R 4/56 |
| 2013/0020993 | A1 | 1/2013 | Taddeo et al. |
| 2015/0137755 | A1 | 5/2015 | Sadano et al. |
| 2020/0122594 | A1 | 4/2020 | Ichikawa |

FOREIGN PATENT DOCUMENTS

| EP | 3974240 A1 * | 3/2022 | .......... H01R 31/065 |
| JP | 2015-100185 A | 5/2015 | |
| JP | 2020-065394 A | 4/2020 | |

* cited by examiner

Primary Examiner — Briggitte R. Hammond
(74) Attorney, Agent, or Firm — Finnegan, Henderson, Farabow, Garrett & Dunner, LLP

(57) ABSTRACT

A charging inlet, to which a charging connector provided external to a vehicle is connected, includes a housing and a terminal unit provided in the housing. The terminal unit includes a first DC pin, a second DC pin, a first communication pin, a second communication pin, and a ground pin. The housing includes a blocking member. When an AC/DC charging connector complying with CCS and supporting AC charging and DC charging is to be connected to the charging inlet, blocking members interfere with at least one of a first AC terminal, a second AC terminal, a third AC terminal, and a neutral point terminal that are provided in the AC/DC charging connector, to block connection between the AC/DC charging connector and the charging inlet.

2 Claims, 4 Drawing Sheets

CHARGING INLET

This nonprovisional application is based on Japanese Patent Application No. 2021-011918 filed on Jan. 28, 2021 with the Japan Patent Office, the entire contents of which are hereby incorporated by reference.

BACKGROUND

Field

The present disclosure relates to a charging inlet.

Description of the Background Art

As a charging inlet of a vehicle, an inlet compatible with an alternating-current (AC) charging connector and a direct-current (DC) charging connector has been known. For example, inlets complying with the Combined Charging System (CCS, which is also called "combo") standard have been known. It has been considered to provide such a vehicle with an AC charging function as an option.

An inlet not having an AC charging function as an option has only a DC charging function.

Thus, a system disclosed in Japanese Patent Laying-Open No. 2020-065394 is configured to provide a notification about whether a charging inlet supports both AC charging and DC charging or supports only DC charging.

SUMMARY

However, in the charging inlet provided in the above-mentioned system, an AC charging connector can be physically connected thereto.

Thus, a user may feel confusion since charging cannot be started even though the charging connector has been able to be connected.

The present disclosure has been made in view of the above-described problems. An object of the present disclosure is to provide a charging inlet capable of physically blocking connection of an AC charging connector.

A charging inlet according to the present disclosure, to which a charging connector provided external to a vehicle is connected, includes: a housing; and a terminal unit provided in the housing. The terminal unit includes a first DC pin, a second DC pin, a first communication pin, a second communication pin, and a ground pin. The housing includes a blocking member. When an AC charging connector is to be connected to the charging inlet, the blocking member interferes with at least one of a first AC terminal, a second AC terminal, a third AC terminal, and a neutral point terminal that are provided in the AC charging connector, to block connection between the AC charging connector and the charging inlet. The housing is provided with: a first terminal hole provided at a position corresponding to the first AC terminal; a second terminal hole provided at a position corresponding to the second AC terminal; a third terminal hole provided at a position corresponding to the third AC terminal; and a fourth terminal hole provided at a position corresponding to the neutral point terminal. The blocking member is provided in at least one of the first terminal hole, the second terminal hole, the third terminal hole, and the fourth terminal hole.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
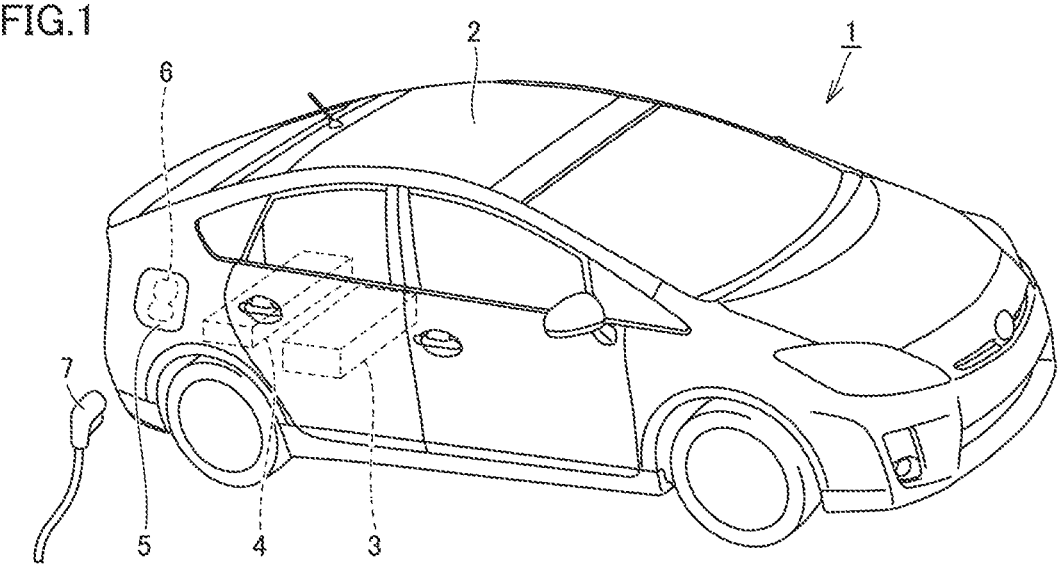
FIG. 1 is a schematic diagram schematically showing a vehicle 1 equipped with an inlet 6 according to the present embodiment.

The following describes a charging inlet according to the present embodiment with reference to FIGS. 1 to 7. The same or substantially the same components among the components shown in FIGS. 1 to 7 will be denoted by the same reference characters and the description thereof will not be repeated.

FIG. 1 is a schematic diagram schematically showing a vehicle 1 equipped with an inlet 6 according to the present embodiment. Vehicle 1 includes a body 2, a battery 4, a cover 5, and inlet 6.

Battery 4 is a chargeable and dischargeable secondary battery and mounted in body 2. Battery 4 is a lithium ion battery, for example. Cover 5 is provided on a side surface of body 2. Body 2 is provided with an opening that is opened and closed by cover 5. Cover 5 is opened to thereby expose inlet 6. Battery 4 is charged in the state where charging connector 7 is connected to inlet 6.

Figure 2:
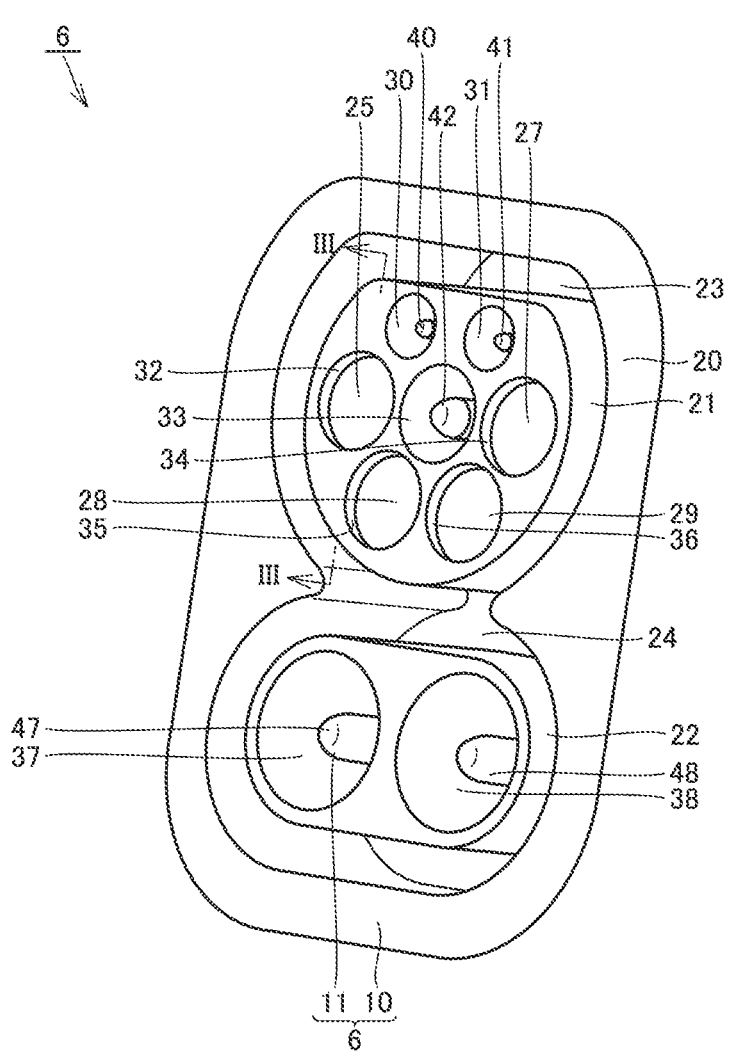
FIG. 2 is a perspective view showing inlet 6.

FIG. 2 is a perspective view showing inlet 6. Inlet 6 includes a resin housing 10 and a terminal unit 11.

Resin housing 10 includes a base plate 20, mounts 21, 22, and a bottom plate 24. Mounts 21 and 22 are formed to protrude from bottom plate 24. Base plate 20 is provided with an insertion groove 23 formed to surround the outer circumference of mounts 21 and 22.

Mount 21 is provided with a plurality of terminal holes 30 to 36. Mount 22 is provided with a plurality of terminal holes 37 and 38.

Terminal unit 11 includes a communication pin (a first communication pin) 40, a communication pin (a second communication pin) 41, a ground pin 42, and DC pins 47, 48.

Communication pins 40 and 41 are disposed inside terminal holes 30 and 31, respectively. Ground pin 42 is disposed inside terminal hole 33. DC pins 47 and 48 are disposed inside terminal holes 37 and 38, respectively.

Terminal holes 30, 31, 32, 34, 35, and 36 are disposed to surround terminal hole 33. Terminal holes 30 and 31 are disposed above terminal hole 33 and arranged in the lateral direction. Terminal holes 32, 33, and 34 are arranged in the lateral direction. Terminal holes 32 and 34 are disposed with terminal hole 33 interposed therebetween. Terminal holes 35 and 36 are disposed below terminal hole 33 and arranged in the lateral direction.

Inlet 6 is a charging connector complying with CCS (Combined Charging System) as one of EV fast charging standards. Inlet 6 is a DC charging inlet and does not support AC charging.

In general, in the inlet supporting DC charging and AC charging, an AC charging pin is provided inside each of terminal holes 32, 35, and 36 while a neutral point pin is provided inside terminal hole 34.

In inlet 6 in the present embodiment, blocking components 25, 27, 28, and 29 are provided inside terminal holes 32, 34, 35, and 36, respectively. Specifically, blocking components 25, 27, 28, and 29 fill terminal holes 32, 34, 35, and 36, respectively.

Figure 3:
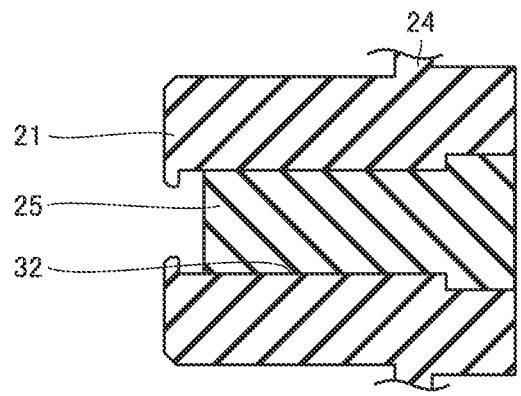
FIG. 3 is a cross-sectional view showing a terminal hole 32, a blocking component 25, and a configuration around them.

FIG. 3 is a cross-sectional view showing terminal hole 32, blocking component 25, and a configuration around them. In the example shown in FIG. 3, blocking component 25 fills terminal hole 32. Blocking component 25 is formed of an insulating material such as resin. Note that terminal holes 34, 35 and 36 are also filled with blocking components 27, 28, and 29, respectively.

Figure 4:
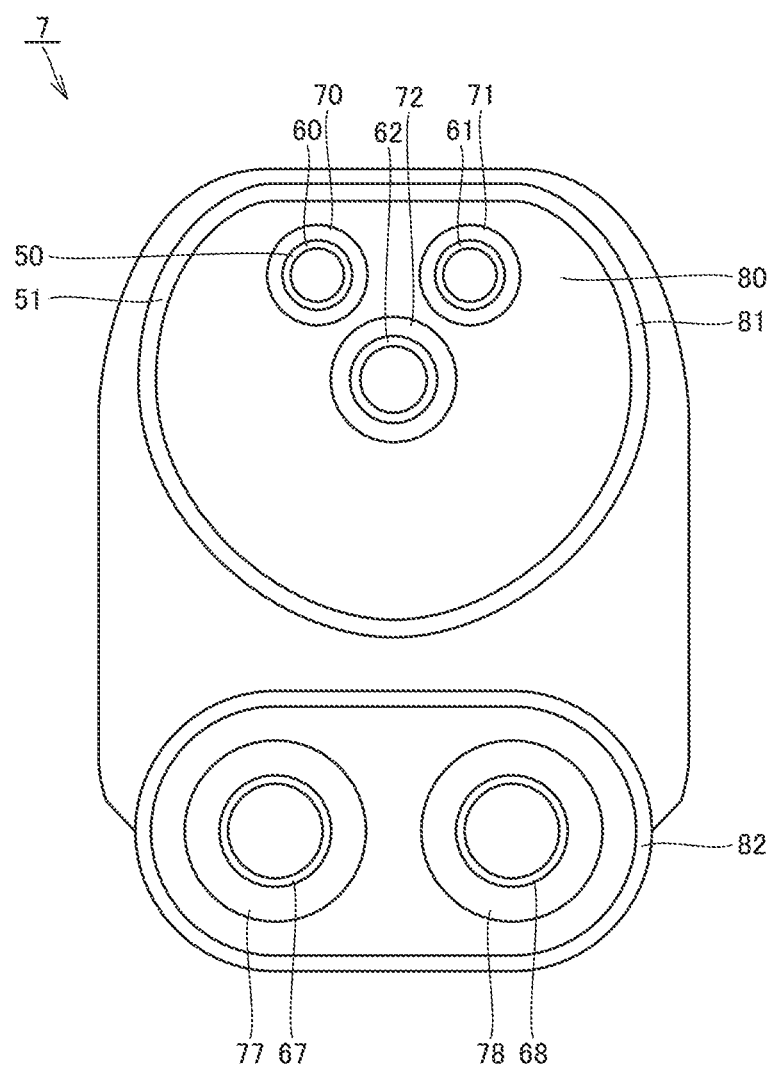
FIG. 4 is a front view showing a charging connector 7.

FIG. 4 is a front view showing charging connector 7. Charging connector 7 complies with CCS as one of EV fast charging standards. Note that CCS is a charging method proposed as a standard by Charging Interface Initiative (CharIN) e.V. Charging connector 7 serves as a DC charging connector and does not have an AC charging function.

Charging connector 7 includes a terminal unit 50 and a resin housing 51. Terminal unit 50 includes a plurality of tubular terminals. Specifically, terminal unit 50 includes communication terminals 60, 61, a grounding terminal 62, and DC terminals 67, 68. Communication terminal 60 is a "CP Pin", through which the information about the current that can be supplied by electric vehicle service equipment (EVSE: a charging station) is transmitted to vehicle 1. Communication terminal 61 is a "PP pin", through which the EVSE is notified that vehicle 1 is connected. Through DC terminals 67 and 68, the direct current supplied from the EVSE is supplied to vehicle 1.

Communication terminals 60, 61, grounding terminal 62, and DC terminals 67, 68 each are formed in a tubular shape. Resin housing 51 includes a plurality of tubular portions 70 to 72, 77, and 78, a base plate 80, and frame portions 81, 82. Base plate 80 is formed in a plate shape. Each of tubular portions 70 to 72, 77, and 78 is formed to be hollow.

Communication terminals 60 and 61 are disposed inside tubular portions 70 and 71, respectively. Grounding terminal 62 is disposed inside tubular portion 72. DC terminals 67 and 68 are disposed inside tubular portions 77 and 78, respectively.

The plurality of tubular portions 70 to 72, 77, 78 and frame portions 81, 82 are formed to rise from base plate 80. Frame portion 81 is formed to surround tubular portions 70 to 72. Frame portion 82 is formed to surround tubular portions 77 and 78.

When charging connector 7 is connected to inlet 6, communication pins 40 and 41 of inlet 6 are inserted into communication terminals 61 and 60, respectively, of charging connector 7, and ground pin 42 is inserted into grounding terminal 62. This allows communication between vehicle 1 and the EVSE. In this case, tubular portions 70, 71, and 72 are inserted into terminal holes 31, 30, and 33, respectively, of inlet 6.

DC pins 47 and 48 of inlet 6 are inserted into DC terminals 68 and 67, respectively. Thereby, DC power is to be supplied from the EVSE through DC pins 47 and 48 and their respective DC terminals 68 and 67 to vehicle 1.

In this case, tubular portions 70, 71, 72, 77, and 78 of charging connector 7 are inserted into terminal holes 31, 30, 33, 38 and 37, respectively. Also, frame portions 81 and 82 are inserted into insertion groove 23.

Figure 5:
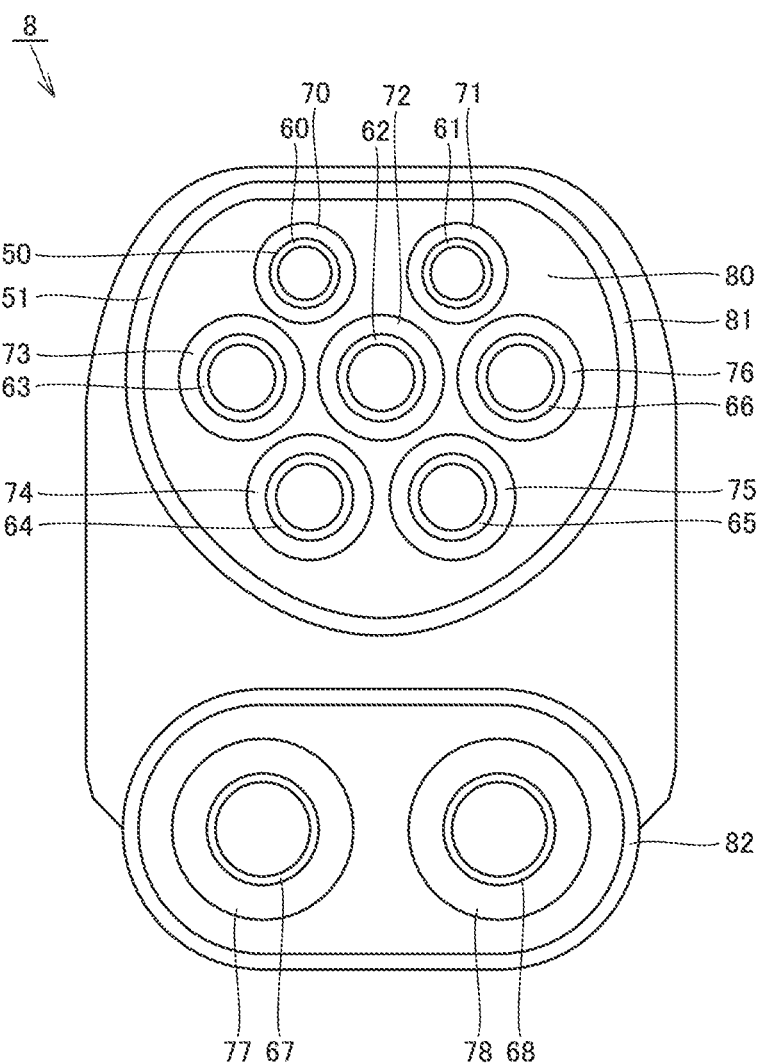
FIG. 5 is a front view showing an AC/DC charging connector 8.

FIG. 5 is a front view showing an AC/DC charging connector 8. AC/DC charging connector 8 serves as a charging connector supporting both DC charging and AC charging. The DC charging function of AC/DC charging connector 8 complies with CCS as one of EV fast charging standards. In the present embodiment, AC/DC charging connector 8 is presented as one example of the AC charging connector.

AC/DC charging connector 8 has a configuration similar to that of charging connector 7. In addition to the configuration of charging connector 7, AC/DC charging connector 8 further includes AC terminals 63, 64, and 65, a neutral point terminal 66, and tubular portions 73 to 76.

AC terminals 63, 64, and 65 are disposed inside tubular portions 73, 74, and 75, respectively, and neutral point terminal 66 is disposed inside tubular portion 76.

According to AC/DC charging connector 8, in the case where a charging inlet provided in a vehicle supports both. DC charging and AC charging, AC/DC charging connector 8 is connected to this charging inlet, and thereby, the vehicle can be charged with DC charging or AC charging.

When AC/DC charging connector 8 is to be connected to inlet 6 in this case, terminal hole (the first terminal hole) 34 shown in FIG. 2 is provided at the position corresponding to AC terminal (the first AC terminal) 63 shown in FIG. 5. Terminal hole (the second terminal hole) 36 is provided at the position corresponding to AC terminal (the second AC terminal) 64. Terminal hole (the third terminal hole) 35 is provided at the position corresponding to AC terminal (the third AC terminal) 65. Terminal hole 32 (the fourth terminal hole) is provided at the position corresponding to neutral point terminal 66.

Terminal holes 32, 34, 35, and 36 are filled with blocking components 25, 27, 28, and 29, respectively. Accordingly, when AC/DC charging connector 8 is to be connected to inlet 6, blocking components 25 27, 28, and 29 interfere with neutral point terminal 66, AC terminals 63, 65, and 64, respectively. As a result, AC/DC charging connector 8 cannot be connected to inlet 6.

Thus, since connection of AC/DC charging connector 8 to inlet 6 is suppressed in this way, the user can immediately recognize that inlet 6 is not compatible with AC/DC charging connector 8.

In the present embodiment, a blocking component is provided in each of terminal holes 32, 34, 35, and 36 but may be provided in at least one of terminal holes 32, 34, 35, and 36.

Figure 6:
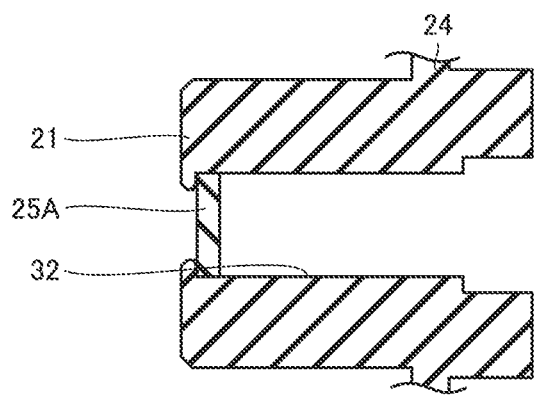
FIG. 6 is a cross-sectional view showing a blocking component 25A as a first modification of blocking component 25.

FIG. 6 is a cross-sectional view showing a blocking component 25A as a first modification of blocking component 25. Blocking component 25A is formed to block an opening of terminal hole 32. Thereby, insertion of tubular portion 76 and neutral point terminal 66 of AC/DC charging connector 8 shown in FIG. 5 into terminal hole 32 can be suppressed.

Figure 7:
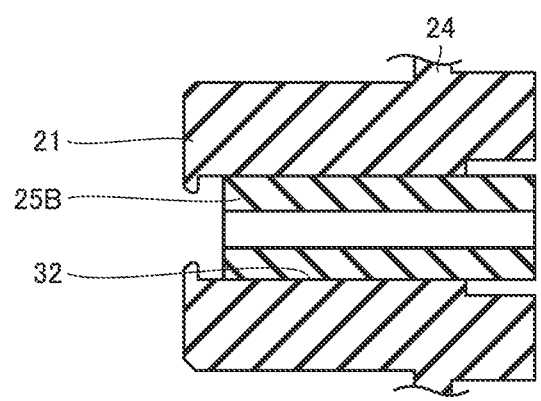
FIG. 7 is a cross-sectional view showing a blocking component 25B as a second modification of blocking component 25.

FIG. 7 is a cross-sectional view showing a blocking component 25B as a second modification of blocking component 25. Blocking component 25B is formed in a tubular shape and provided inside terminal hole 32. Blocking component 25B can also suppress insertion of tubular portion 76 and neutral point terminal 66 of AC/DC charging connector 8 shown in FIG. 5. Thus, a blocking component employed in this case may be formed in various shapes.

It the present embodiment, AC/DC charging connector 8 is presented as one example of the AC charging connector, but does not need to have a DC charging function. For example, the AC charging connector not having a DC charging function is not provided with frame portion 82, tubular portions 77 and 78, and DC terminals 67 and 68 that are shown in FIG. 5. Connection of such an AC charging connector to inlet 6 can also be suppressed by blocking components 25, 27, 28, 29, and the like.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging inlet to which a charging connector provided external to a vehicle is connected, the charging inlet comprising:
   a housing; and
   a terminal unit provided in the housing, wherein
   the terminal unit includes a first DC pin, a second DC pin, a first communication pin, a second communication pin, and a ground pin,
   the housing includes a first mount, a second mount, and a blocking member,
   the first communication pin, the second communication pin, and the ground pin are provided at the first mount, and
   the first DC pin and the second DC pin are provided at the second mount,
   when a DC charging connector is connected to the first mount and the second mount, a first DC terminal of the DC charging connector is connected to the first DC pin, a second DC terminal of the DC charging connector is connected to the second DC pin, a first communication terminal of the DC charging connector is connected to the first communication pin, and a second communication terminal of the DC charging connector is connected to the second communication pin,
   when an AC charging connector is connected to the first mount, the first communication pin is provided at a position corresponding to a third communication terminal of the AC charging connector, and the second communication pin is provided at a position corresponding to a fourth communication terminal of the AC charging connector,
   when the AC charging connector is connected to the first mount the charging inlet, the blocking member interferes with at least one of a first AC terminal, a second AC terminal, a third AC terminal, and a neutral point terminal that are provided in the AC charging connector, to block connection between the AC charging connector and the charging inlet, wherein
   the first mount is provided with
      a first terminal hole provided at a position corresponding to the first AC terminal,
      a second terminal hole provided at a position corresponding to the second AC terminal,
      a third terminal hole provided at a position corresponding to the third AC terminal, and
      a fourth terminal hole provided at a position corresponding to the neutral point terminal, and
   the blocking member is provided in at least one of the first terminal hole, the second terminal hole, the third terminal hole, and the fourth terminal hole.

2. The charging inlet according to claim 1, wherein the blocking member is formed of an insulating material.

\* \* \* \* \*